April 13, 1965 C. L. WEIMER ETAL 3,178,668

BUS DUCT AND PLUG-IN FEATURE

Original Filed July 16, 1959 7 Sheets-Sheet 1

INVENTORS
Charles L. Weimer and
Samuel S. Fouse.
BY
ATTORNEY

April 13, 1965 C. L. WEIMER ETAL 3,178,668
BUS DUCT AND PLUG-IN FEATURE
Original Filed July 16, 1959 7 Sheets-Sheet 2

BUS DUCT AND PLUG-IN FEATURE

Original Filed July 16, 1959 7 Sheets-Sheet 4

April 13, 1965 C. L. WEIMER ETAL 3,178,668

BUS DUCT AND PLUG-IN FEATURE

Original Filed July 16, 1959 7 Sheets-Sheet 6

United States Patent Office 3,178,668

Patented Apr. 13, 1965

3,178,668

BUS DUCT AND PLUG-IN FEATURE

Charles L. Weimer, Patterson Heights, and Samuel S. Fouse, Hopewell Township, Beaver County, Pa., assignors to Westinghouse Electric Corporation, Pittsburgh, Pa., a corporation of Pennsylvania Continuation of application Ser. No. 827,584, July 16, 1959. This application Jan. 16, 1963, Ser. No. 252,547
21 Claims. (Cl. 339—22)

This invention relates, generally, to electric power distribution apparatus and, more particularly, to bus duct structures and plug-in or power take-off units for these structures.

This application is a continuation of the now-abandoned application Serial No. 827,584, filed July 16, 1959. A pending application, Serial No. 228,941, filed October 8, 1962, is a division of the now-abandoned application Serial No. 827,584, filed July 16, 1959.

It is known that the reactance of a multi-phase power transmission system is reduced by spacing the phase conductors closely together. The close spacing neutralizes the magnetic fields and minimizes the skin and proximity effects normally caused when alternating current flows through the bus bars and, therefore, reduces the overall impedance to a minimum amount. If parallel-connected phase conductors are utilized, the inductive reactance of the system is reduced by so interlacing the phases that different phase conductors are adjacent.

In many aircraft, electronic, military and industrial operations, closely regulated voltages of high frequency power distribution are required. The present invention has particular utility for these operations in that tests have shown that the voltage drop at 400 cycles of this new plug-in bus duct is lower than the voltage drop of conventional plug-in bus duct at 60 cycles.

It is a general object of the invention to provide bus duct structure which is simple and efficient in operation and which may be economically manufactured and installed.

A further object is to provide sections of bus duct with rigidly supported connections that provide convenient access to workmen.

Another object is to provide for connecting sections of bus duct by connecting together clamps which are connected to said bus duct.

Another object is to provide for connecting together bus duct sections by an interconnection of generally U-shaped clamps.

Another object is to provide multiphase bus duct with an interphase transposition along the length thereof.

Another object is to provide multiphase bus duct with closely spaced bus bars that have rigidly supported, conveniently accessible interphase transpositioning connections.

Another object is to provide interphase transpositions along the length of two sets of multiphase bus bars supported in a parallel spaced mutually flatwise relation.

Another object is to provide for tying together all like phases at interphase transpositioning connections of sections of but duct where each section is composed of a plurality of sets of multiphase bus duct conductors.

Another object is to provide a bus duct plug-in structure which is simple and efficient in operation and which may be economically manufactured and installed.

A further object is to provide a bus duct plug-in unit which can be utilized with closely spaced bus duct structure.

Another object is to provide multiphase bus duct structure which can receive contact elements that are lineally spaced lengthwise of the structure.

A still further object is to provide a plug-in unit that can be utilized with bus duct structure adapted to receive contact elements that are lineally spaced lengthwise of said structure.

A still further object is to provide an efficient economical and adequately insulated area in the housing of bus duct structure for receiving contact elements of a plug-in unit.

These and other objects of this invention will become more apparent upon consideration of the following detailed description of preferred embodiments thereof, when taken in connection with the attached drawings, in which.

Figure 1:
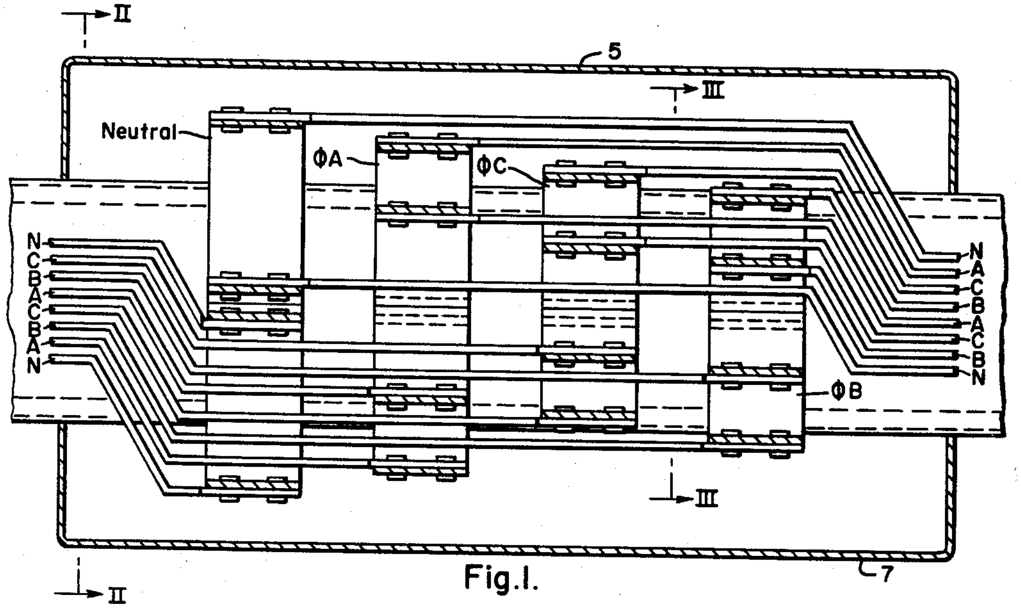
FIGURE 1 is a sectional view taken on line I—I of FIG. 2 showing the bus duct phase transpositioning connection.
Figure 2:
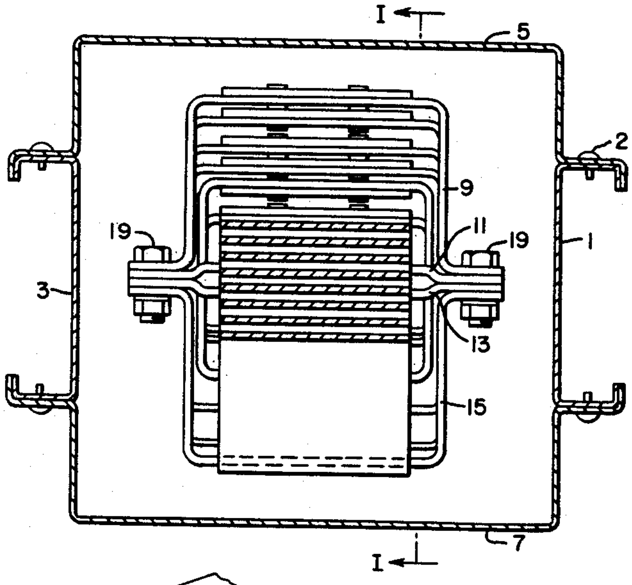
FIG. 2 is a sectional view taken on line II—II of FIG. 1.

Referring to the drawings, and particularly to FIGS. 1 and 2, sheet metal channel members 1 and 3 are side members of lengths of bus duct housing. These members are fastened by bolts 2 to sheet metal channel access covers 5 and 7 to form a suitable housing for the phase transpositioning connections illustrated in FIG. 1.

The bus duct housing and the housing for the phase transpositioning connections are made of a non-magnetic material, preferably aluminum. This eliminates magnetic circuits about the bus duct, thereby further reducing losses in the system.

Entering the connection housing at each end are two sets of four flat bus bar conductors arranged in a parallel spaced mutually flatwise relation. Each of these sets is composed of a neutral bus bar and three bus bars, each of which conducts a different phase of multiphase electric power distribution. The neutrals are disposed at the outside of each set.

The sets of bus bars enter the connection housing at the same level. In order that these sets may be vertically disposed in a mutually flatwise relation within the housing, the bus bars of the sets entering the housing at the left as shown in FIG. 1 are offset to planes lower than their original planes and the bus bars of the set entering the housing at the right are offset to planes higher than their original planes. As seen in FIG. 1, therefore, these sets overlap at their ends within the bus bar connection housing.

Figure 4:
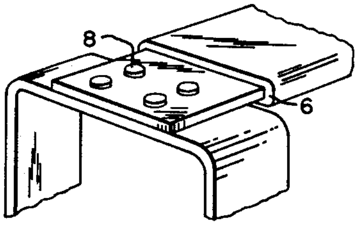
FIG. 4 is a perspective view of a typical bus bar and clamp connection, the end portion of the bus bar being uninsulated.

A U-shaped flange metal conductor clamp is riveted to the uninsulated end of each bus bar. The bus bars and conductor clamps are preferably silver plated to insure high conductivity and low heat rise. Except for the areas where electrical contact is made, the bus bars are insulated with a suitable plastic material or insulating tape 6. For purposes of clarity, this insulation is not shown in FIGS. 1, 2, 3 and 5. FIG. 4, however, is a perspective view showing the uninsulated end of a bus bar and clamp connected by rivets 8 or other suitable means. It is to be understood that all of the bus bars shown in FIGS. 1, 2, 3 and 5 are insulated, and that the end of each is uninsulated for connection as is shown in FIG. 4. The U-shaped clamps connected to the bus bars entering the connection housing from the left as seen in FIG. 1 have their open ends up and the U-shaped clamps connected to the bus bars entering from the right have their open ends down.

Figure 3:
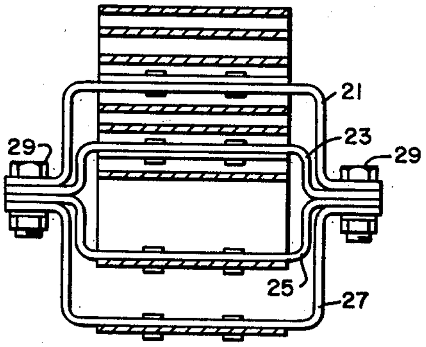
FIG. 3 is a sectional view taken on line III—III of FIG. 1.

The bus bars are relatively positioned so that, when the two sections are connected, the clamps at the ends of all like phases may be collected and bolted together at their flanges. In order that these clamps may be collected together, the U-shape of the outer clamps is deeper and broader than that of the inner clamps. As seen in FIG. 2, the U-shapes of clamps 9 and 15 are deeper and broader than those of clamps 11 and 13. As shown in FIG. 3, the U-shapes of clamps 21 and 27 are deeper and broader than those of clamps 23 and 25. FIG. 2 shows the four neutral clamps 9, 11, 13 and 15 bolted together by bolts 19 at their flanges, and FIG. 3 shows the four phase B clamps 21, 23, 25 and 27 bolted together at their flanges by bolts 29. In FIG. 1 it will be seen that all like phases are connected, that the clamps for like phases are on the same center lines transversely of the housing, and that the clamps of unlike phases are spaced longitudinally within the housing. This facilitates the making of tap connections at joints between sections.

The connections shown in FIG. 1 have effected an interphase transposition within each multiphase set of bus bars. The phase relationship of each set entering the connection housing from the left is $\phi$C–$\phi$B–$\phi$A, and the phase relationship of each set leaving the housing is $\phi$A–$\phi$C–$\phi$B. The neutrals are shown remaining on the outside so that the spacing from phase to neutral will be equalized by the rotation of phases.

Figure 6:
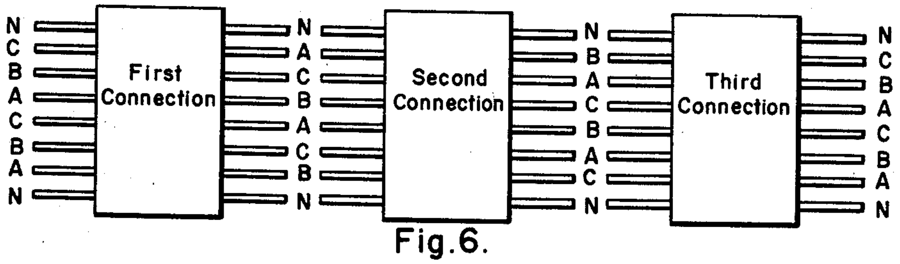
FIG. 6 is a schematic diagram showing three phase transpositioning connections similar to that of FIG. 1 with a return to the original phasing at the third connection.

FIG. 6 shows schematically three interphase transpositioning connections, similar to the connection shown in FIG. 1, with a return to the original phase relationship at the third connection.

Referring to FIGS. 1, 2 and 3, it will be seen that the U-shaped clamps provide very stable connections in that they are supported on both sides by their flanges. It should be noted that a workman can have easy access to these connections because the bolts 19 and 29 are disposed at the sides of the bus bars.

In addition to effecting a transposition of phases at the connections, all like phases are also collected and electrically connected. This effects a balancing of the load on each set of bus bars.

Figure 5:
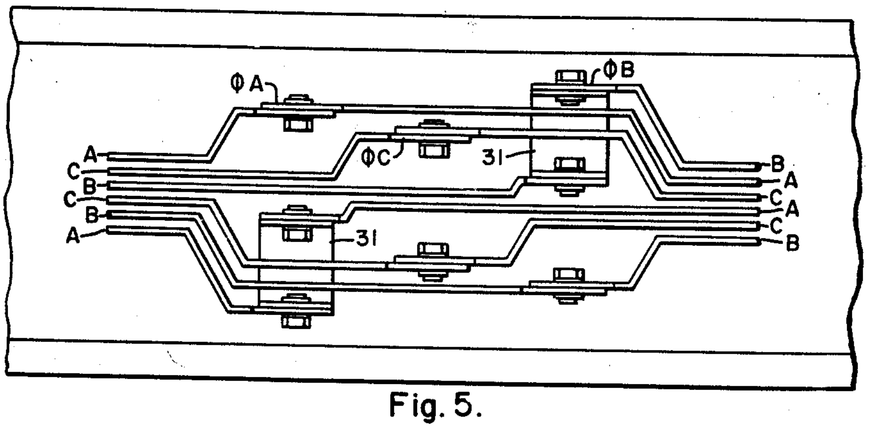
FIG. 5 is a view in section showing a modified form of the connection shown in FIG. 1 without the neutral bus bars.

FIG. 5 shows a modified form of the invention. This figure also shows an interphase transpositioning connection of two sections of bus ducts where each section is composed of two sets of multiphase bus bars. The particular embodiment shows two three-phase three-wire sets of bars. It will be understood that the invention is also applicable to three-phase four-wire systems.

It will be seen that the phase relationship of the uppermost set of multiphase bus bars as seen in FIG. 5 is transposed by one U-shaped clamp 31. This clamp transposes the phase B bus bar from a lowermost position within the top set of bus bars to an uppermost position. The phase relationship, therefore, is transposed from $\phi$A–$\phi$C–$\phi$B to $\phi$B–$\phi$A–$\phi$C going from left to right in FIG. 5.

Similarly, another clamp 31, by transposing phase A in the lower set of bus bars, has effected a transposition of phases from $\phi$C–$\phi$B–$\phi$A to $\phi$A–$\phi$C–$\phi$B going from left to right in FIG. 5.

Figure 7:
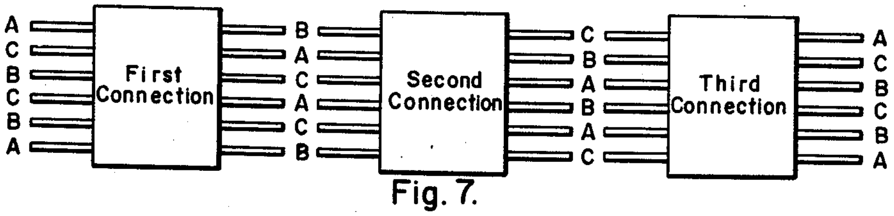
FIG. 7 is a schematic diagram showing three phase transpositioning connections similar to that of FIG. 5 with a return to the original phasing at the third connection.

The phase transpositioning connection of FIG. 5 is shown schematically as a first connection in FIG. 7. Two other similar phase transpositioning connections are schematically shown with a return to the original phasing at the third connection.

Figure 8:
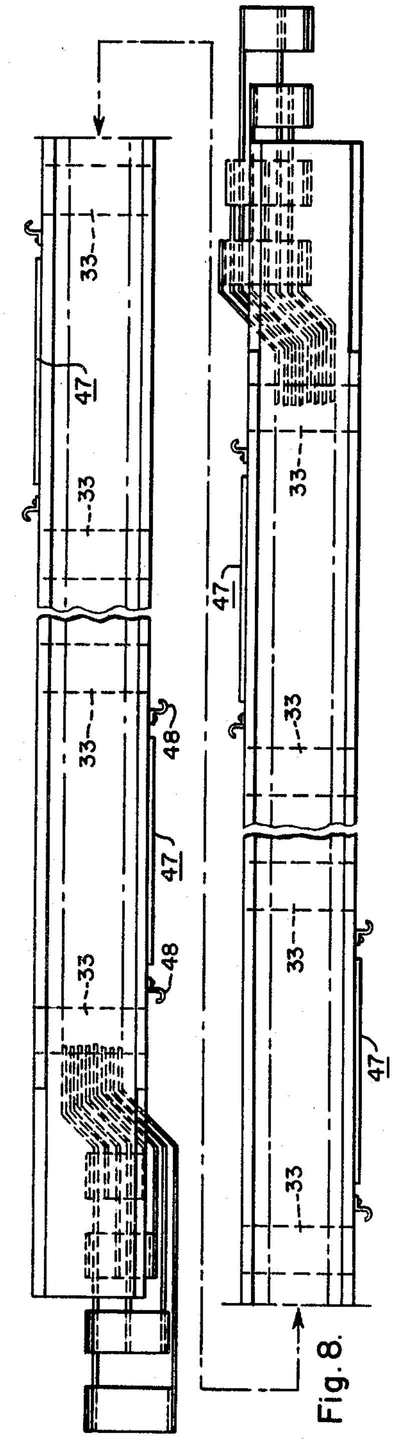
FIG. 8 is a side elevational view in two halves of a section of bus duct.
Figure 9:
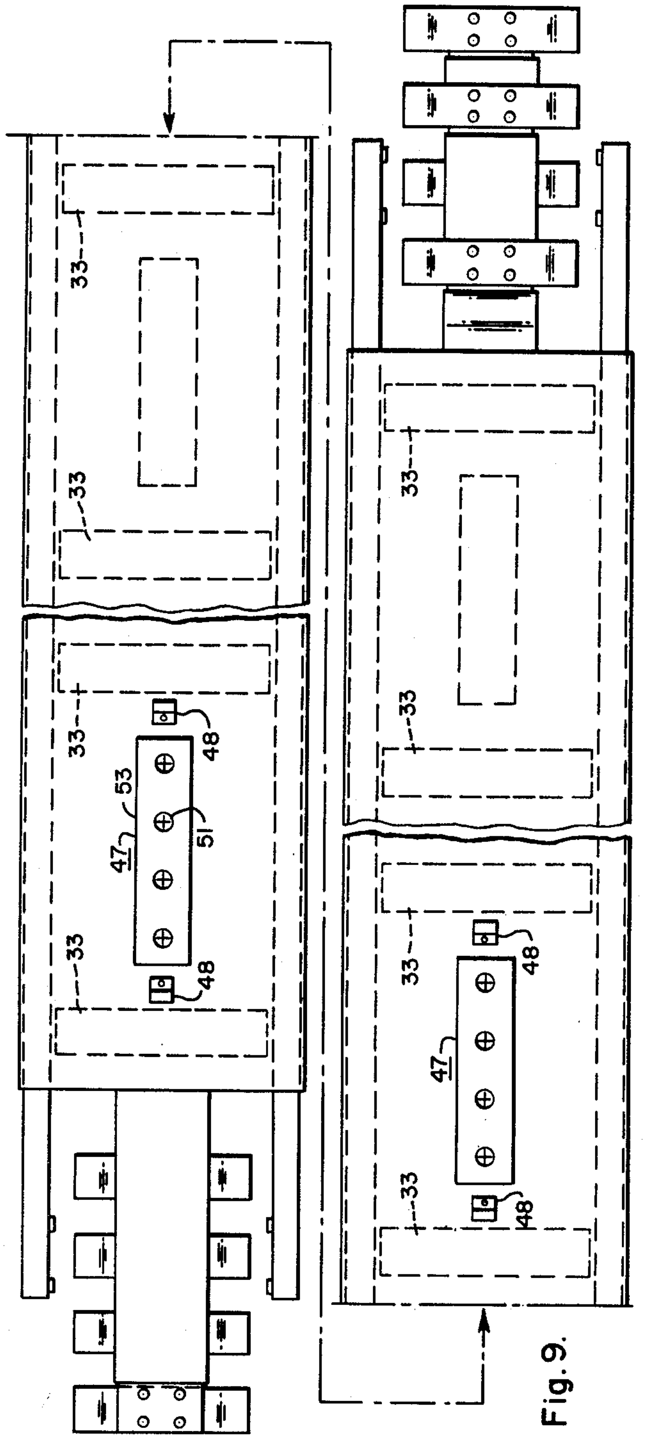
FIG. 9 is a bottom plan view of the two halves of the section of bus duct shown in FIG. 8.

A ten-foot section of bus duct partly broken away is shown in two halves in FIGS. 8 and 9. As shown in these figures and in FIGS. 10 and 18, the insulated bus bars are supported within the housing by eight sets of supports 33. These supports are each composed of two C-shaped blocks 35 and 37 which are preferably made from hard wood. These blocks are drawn towards each other by two bolts 41 firmly supporting the bus bars in place. Two depressions 43 are cut into each block so that the nut and bolt heads do not occupy any additional space outside of the blocks. Spacer elements 45 of suitable insulating material are provided at each support. As shown most clearly in FIG. 10, these spacer elements are generally H-shaped. The blocks 35 and 37 firmly grasp the bus bars between the legs of the spacer elements 45, thereby supporting the bus bars and preventing longitudinal movement of the spacer elements.

Each section of bus duct has four insulated plug-in areas indicated generally at 47. For convenient accessibility, these areas are staggered lengthwise of the section, two being disposed at the top and two being disposed at the bottom of each section. Two metallic hooked-shaped clamps 48 are mounted on the housing on each side of the plug-in areas in order to permit mounting of plug-in units 66 over these plug-in areas.

Figure 12:
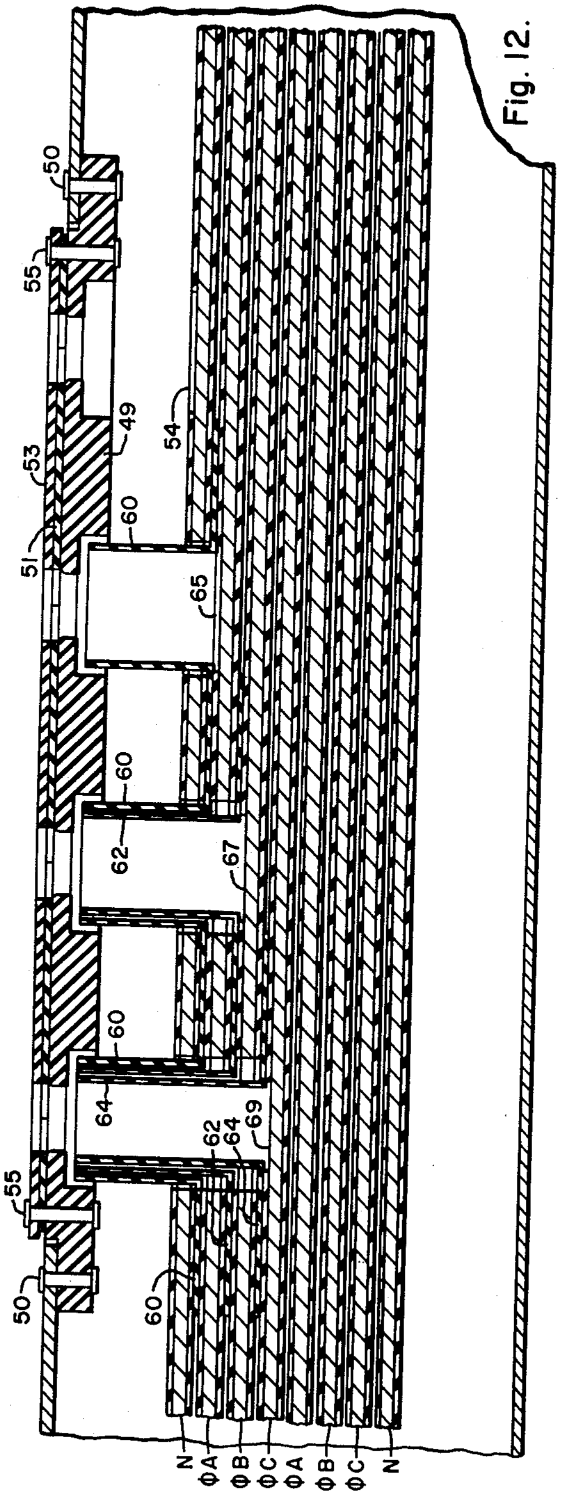
FIG. 12 is a sectional view taken on line XII—XXII of FIG. 11.
Figure 13:
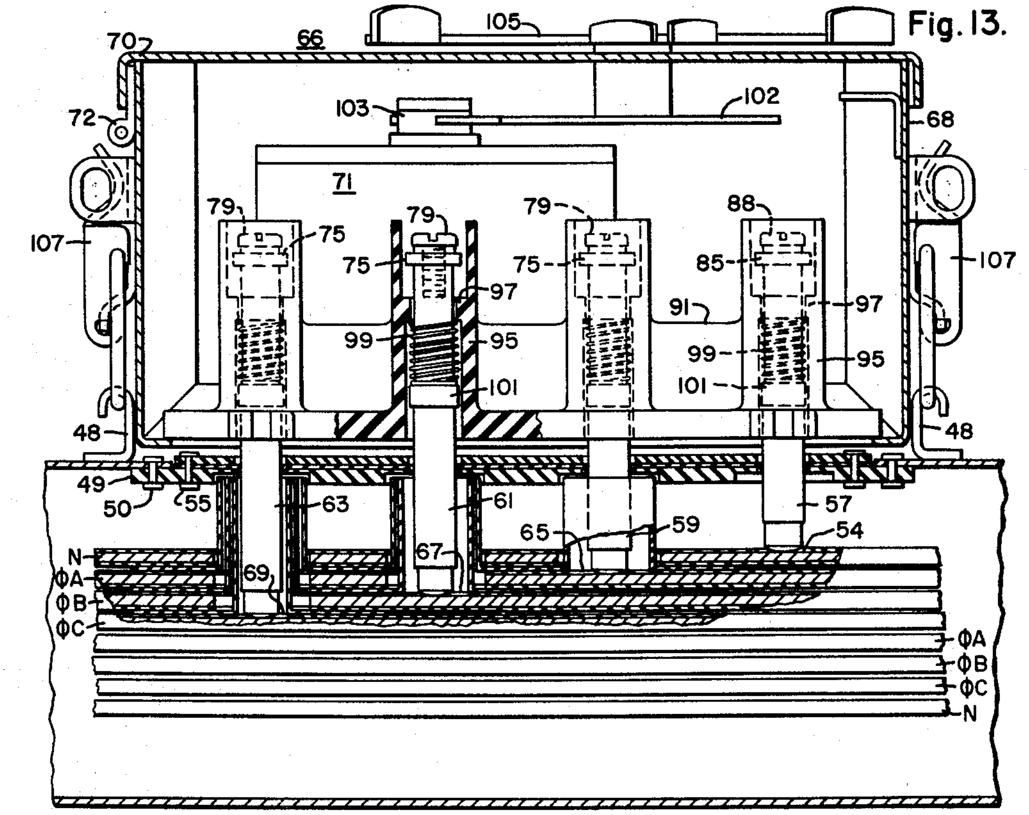
FIG. 13 is a view partly in elevation and partly in section, taken substantially along the line XIII—XIII in FIG. 19, showing applicants' plug-in unit being connected to take off branch circuit current from a length of bus duct.
Figure 17:
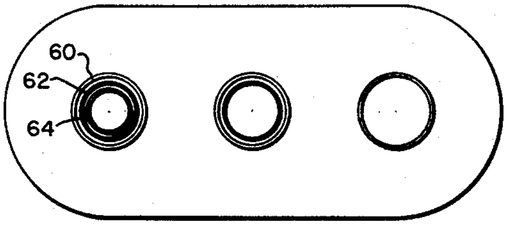
FIG. 17 is a plan view showing the respective positions of the insulating members shown in FIGS. 14, 15 and 16 when they are in place.

At each of the plug-in areas, there is an opening 48' in the housing, and an insulating plate 49 is fastened in place covering this opening by rivets 50 as shown in FIGS. 12 and 13. Each of these plates has four openings in it for receiving contact elements 57, 59, 61 and 63 of the plug-in unit 66. These holes have larger diameters towards the inside of the housing so that they may receive the tops of insulating sleeves on insulating members 60, 62 and 64. A sheet 51, composed of rubber or a similar flexible material, sets on top of the insulating plate 49. Another insulating plate 53, having four holes for receiving the contact elements of the plug-in unit 66, sets on top of this rubber sheet. The two insulating plates, 49 and 53, and the rubber sheet 51, are fastened together by rivets 55.

Figure 11:
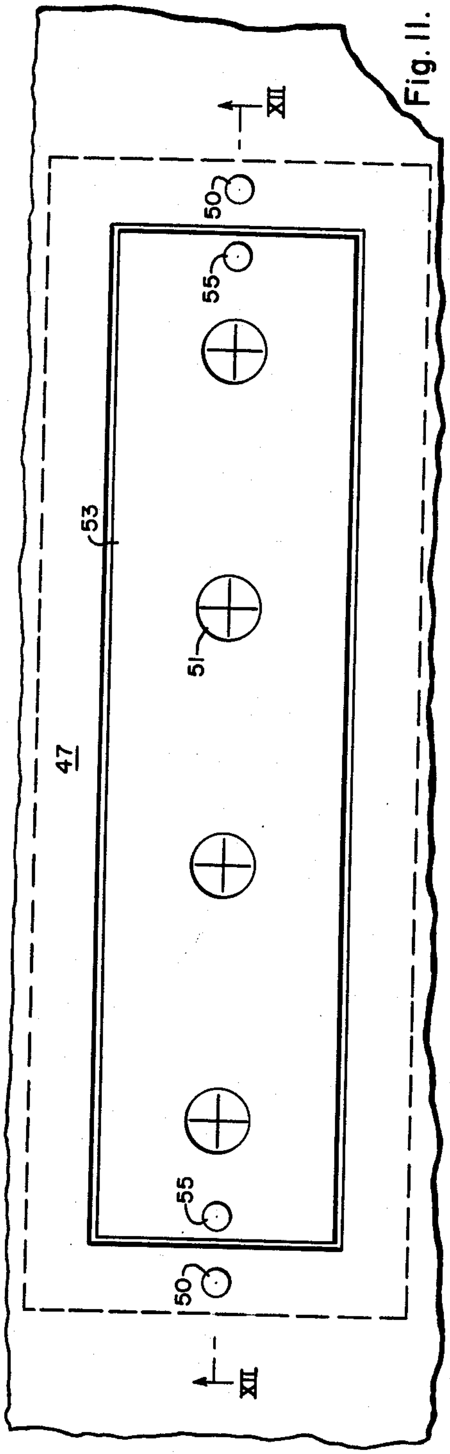
FIG. 11 is a plan view of one of the plug-in areas in a side of the bus duct housing.

As shown in FIG. 11, where the contact elements are to pass through the holes, the rubber sheet 51 is slit in such a manner that it will permit protrusion of these elements but will close when they are withdrawn.

Figure 16:
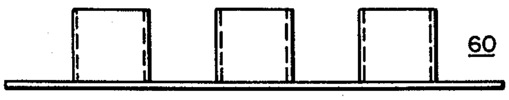
FIGS. 14, 15 and 16 are side elevational views of insulating members used with applicants' invention.

It will be noted that the four holes of the plug-in areas 47 are spaced lineally lengthwise of the bus duct. Provision has been made so that each bus bar can be contacted at its flat side by one contact element. As shown in FIGS. 12 and 13, the insulation of the neutral bus bar has been cut away at 54 so that electrical contact can be made with contact element 57. This neutral bus bar also has three openings in it so that the contact elements 59, 61 and 63 may protrude therethrough. These openings are insulated from contact elements 59, 61 and 63 by the insulating member 60, FIG. 16. This member has three cylindrical sleeves molded integrally with a flat base. The base sets between the neutral and phase A bus bars and the three sleeves protrude through the three openings in the neutral bus bar.

Figure 15:
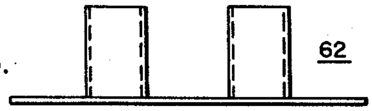

The insulation of the phase A bus bar is cut away at 65 to allow electrical contact with the contact element 59. This bus bar has two openings in it to allow passage of contact elements 61 and 63. These openings are insulated from the contact elements 61 and 63 by the insulating member 62, FIG. 15. This member has two cylindrical sleeves molded integrally with a flat base. The base sets between the phase A and phase B bus bars and the two sleeves protrude through two openings in the phase A bus bar and the neutral bus bar. The diameter of these two sleeves is slightly less than the diameter of the sleeves of the insulating member 60 so that they may fit within the two sleeves of the insulating member 60.

Figure 14:
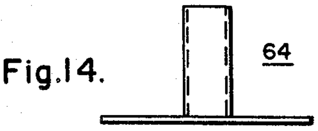

The insulation of the phase B bus bar is cut away at 67 to allow electrical contact with the contact element 61. There is one opening in this bus bar to allow passage of the contact element 63. This opening is insulated from the contact element 63 by the insulating member 64, FIG. 14. This insulating member has one cylindrical sleeve molded integrally with a flat base. The base sets between the phase B and phase C bus bars and its sleeve protrudes through an opening in each of the other bus bars. The diameter of this sleeve is slightly less than the diameter of the sleeves of insulating member 62 so that it may fit within one of the sleeves of insulating member 62.

The insulation of the phase C bus bar is cut away at 69 to allow electrical contact with the contact element 63. There are no openings in this phase C bus bar because there are no contact elements to pass through it.

The contact elements 57, 59, 61 and 63 are preferably silver coated to insure high conducting and low heat rise.

Figures 10, 18:
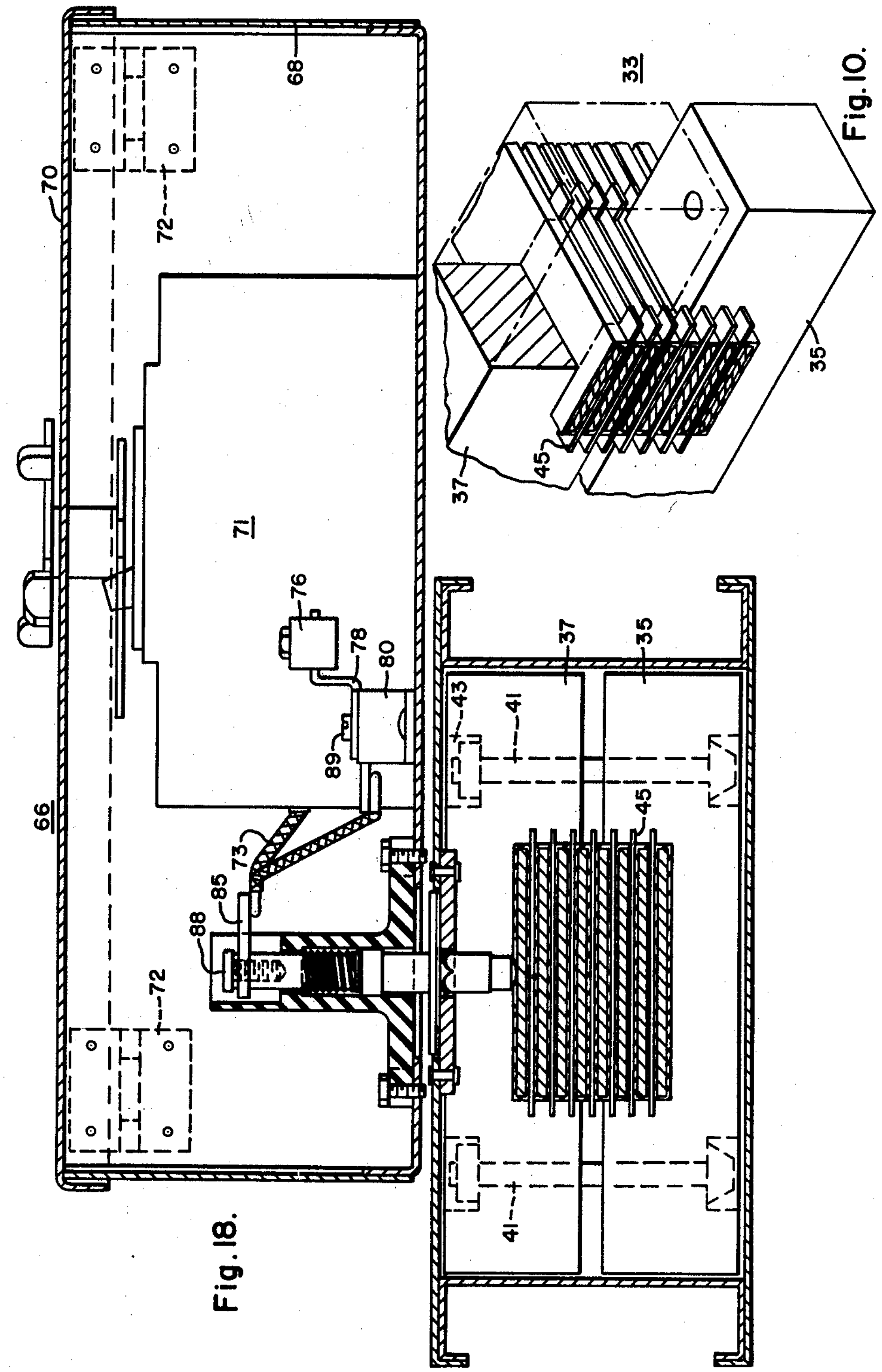
FIG. 10 is a perspective view partly in section of one of the bus bar supporting means.
FIG. 18 is a sectional view taken on line XXVIII—XVIII of FIG. 19, the bus bar supporting means with spacing members being shown in the background.
Figure 19:
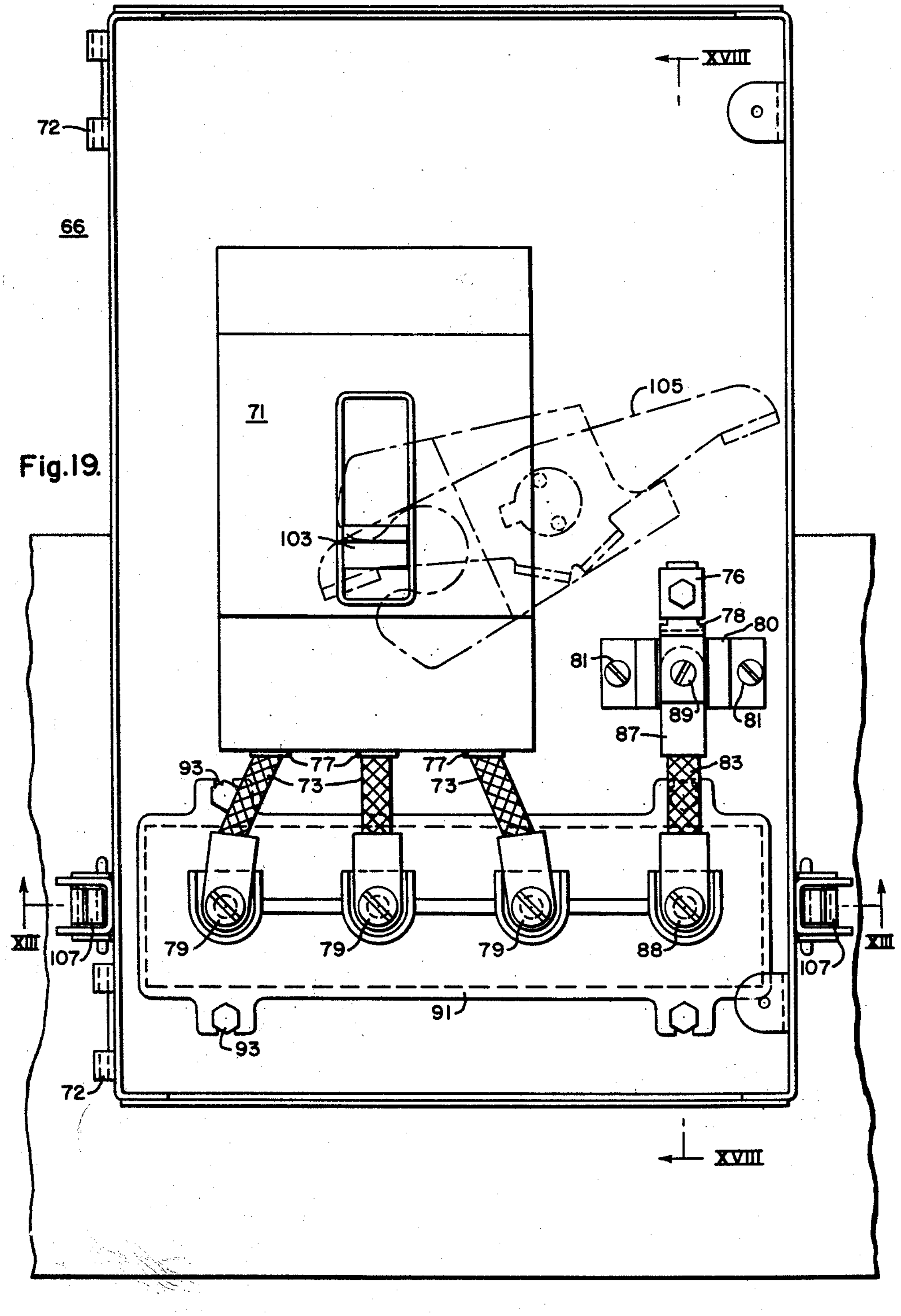
FIG. 19 is a plan view of the plug-in unit, the cover being removed, and the external operating mechanism being shown in broken lines.

Referring now to FIGS. 13, 18 and 19, the plug-in unit indicated generally at 66 comprises a metallic receptacle 68 having a cover 70 openable about hinge members 72. A circuit interrupter unit indicated generally at 71 is mounted on the base of the receptacle 68. The circuit interrupter 71 is electrically connected to the contact elements 59, 61 and 63 by flexible strap conductors 73. The flexible strap conductors 73 have rigid conducting contact members 75 and 77 attached to their ends for connection to the contact elements and for connection to the terminals of the circuit interrupter unit 71. The contact elements 59, 61 and 63 are internally threaded to receive screws 79 that fasten the rigid contact members 75 of the current conducting straps 73 to these contact elements. The rigid contact members 77 are fastened to line terminals (not shown) of the circuit interrupter 71 by screws (not shown).

It will be understood that power conductors (not shown) may be connected to load terminals (not shown) on the interrupter unit to supply power for operating electrical apparatus. It will also be understood that the size of the interrupter units 71, and hence the size of the plug-in unit 66 will depend upon the amount of power required for operating the particular machine or machines connected to the plug-in unit.

A power terminal 76, for the neutral bus bar, is supported by a conducting member 78. The conducting member 78 is supported by an insulating support 80 which is attached to the base of receptacle 68 by screws 81. A flexible conducting strap 83, having rigid conducting contact members 85 and 87 attached to its ends, electrically connects the contact element 57 and the conducting member 78. The contact member 85 is connected to the contact element 57 by a screw 88 and the contact member 87 is connected to the conducting member 78 by a screw 89.

The base of the receptacle 68 has a rectangular opening 90 (FIG. 13) in it to allow passage of the contact elements 57, 59, 61 and 63. This opening is covered by an insulating housing 91 which is fastened to the inside base of receptacle 68 by bolts 93. This housing 91 has a base molded integrally with four insulating wells 95 for receiving the contact elements 57, 59, 61 and 63. The upper portion of each of these wells 95 has a horseshoe-shaped opening for receiving the rigid contact members 75 and 85 of flexible straps 73 and 83, respectively. A cylindrical abutment 97 is provided within each of the wells 95 for engaging the top of a spring 99.

Each of the contact elements has a cylindrical shoulder 101 for engaging the bottom of the spring 99. The cylindrical abutments 97 also serve to engage the contact members 75 and 85 when the plug-in unit 66 is removed from the bus duct housing, thereby preventing the contact elements 57, 59, 61 and 63 from falling through the insulating wells 95.

It will be seen that the springs 99 provide for a resilient contact between the bus bars and the contact elements, and that the flexible conducting straps 73 and 83 do not interfere with this resiliency.

The circuit interrupter unit 71 is provided with an operating handle 103. The plug-in unit 66 is provided with an operating member 102 actuated by an external handle 105 and cooperable with the handle 103 so that the circuit interrupter may be operated when the cover 70 of the plug-in unit 66 is closed.

An interlocking device (not shown) of a type described in Patent No. 2,215,299, issued September 17, 1940, to G. R. Runke and H. S. Gano and assigned to the Westinghouse Electric Corporation, may be provided to prevent opening of the cover 70 when the handle 103 of the circuit interrupter unit 71 is in the closed position. This interlocking device is a safety feature to prevent access to energized parts of the structure.

Two "suitcase" type latches 107 are fastened to the sides of the plug-in unit 6. These latches 107 are cooperable with the metallic clamps 48 on the bus duct housing in order to mount the plug-in unit 66 onto the bus duct over the plug-in areas 47.

From the foregoing description, it will be seen that applicants have provided bus duct sections wherein each section is composed of two sets of closely spaced multi-phase bus bars. The bus bars are connected by U-shaped clamps that collect and electrically connect all like phases, thereby balancing the load on each set, and providing an interphase transposition along each set of bus bars. These connections provide a rigid support for the bus bars, and they are conveniently accessible to workmen.

The bus bars of these sections are adapted to receive contact elements that are lineally spaced lengthwise of the structure. Insulating plug-in areas are provided in the bus duct housing having slit rubber sheets that allow protrusion of the contact elements, but close when these contact elements are withdrawn.

A novel plug-in unit has been provided which can take off power from these bus bars by way of contact elements lineally spaced along the length of the bus duct structure.

Since numerous changes may be made in the above-described construction and different embodiments of the invention may be made without departing from the spirit and scope thereof, it is intended that all matter contained in the foregoing description, or shown in the accompanying drawings, shall be interpreted as illustrative and not in a limiting sense.

We claim as our invention:

1. A section of low impedance bus duct for electric power distribution, said section comprising a housing having opening means in one planar side thereof for receiving a number of butt type contact elements of a plug-in unit, a multi-phase set of bus bars comprising a number of substantially flat bus bars equal to said number of contact elements and supported within said housing in a parallel spaced mutually flatwise relation with their flat faces being disposed in planes substantially parallel to said side of said housing, said bus bars being positioned such that an imaginary straight line normal to said side of said housing passes through all of said bus bars, each of said bus bars comprising a conducting bar and an insulating cover supported on and substantially covering said conducting bar, the dimension between any two adjacent bus bars in said set being less than the dimension of the thickness of any one of said bus bars, and said bus bars being constructed and arranged so that each can receive contact with one of said butt-type contact elements at an uninsulated portion of the flat side thereof that faces said side of said housing.

2. An elongated section of low impedance bus duct for electric power distribution, said section having a plurality of spaced plug-in regions along the length thereof at one side thereof, said section comprising, in combination, an elongated housing having opening means in one planar side thereof at each of said plug-in regions for receiving contact elements of a plug-in unit, a set of a plurality of substantially flat elongated closely spaced bus bars supported within said housing, each of said bus bars being disposed in a different plane each of which planes is generally parallel to the plane of said side of said housing, each of said bus bars being constructed to efficiently conduct electric current along the length thereof, said set of bus bars having opening means therein at each of said plug-in regions in proximity to the associated opening means in said side of said housing to permit passage therethrough of said contact elements to thereby enable each of said bus bars to be contacted by one of said contact elements and said set of bus bars having a first terminal means at one end thereof and a second terminal means at the other end thereof whereby said section is adapted to be connected in a run of bus duct.

3. A section of low impedance bus duct for electric power distribution, said section comprising an elongated structure having a plurality of longitudinally spaced plug-in regions at one side thereof, said section comprising an elongated housing having opening means in one planar side thereof at each of said plug-in regions each of which opening means is adapted to receive a number of contact elements of a removable plug-in unit, a set of a plurality of substantially flat elongated bus bars supported within said housing in a parallel closely spaced mutually flatwise relation with their flat faces being disposed in planes substantially parallel to said side of said housing, said set of bus bars comprising a plurality of conducting bars each of which is constructed to provide efficient current conduction along the length thereof, the bus bar of said set which is closest to said side of said housing having a number of contact-element-receiving holes in it at each of said plug-in regions which number of holes is one less than the number of said contact elements, each succeeding bus bar in said set having a number of contact-element-receiving holes in it at each of said plug-in regions which number of holes is one less than the number of holes in its preceding bus bar, the bus bar of said set which is furtherest away from said side of said housing having no contact-element-receiving holes in it at said plug-in regions, said holes being provided to permit passage therethrough of said contact elements whereby each bus bar can be contacted by one of said contact elements, said section comprising a first terminal means at one end thereof and a second terminal means at the other end thereof whereby said section can be connected in a run of bus duct.

4. A section of low impedance bus duct for electric power distribution, said section comprising an elongated structure having a plurality of longitudinally spaced plug-in regions at one side thereof, said section comprising an elongated housing having opening means in one planar side thereof at each of said plug-in regions, insulating means supported on said side at each of said plug-in regions covering the associated opening means in said housing side and having opening means therein for receiving a number of contact elements of a plug-in unit, a set of a plurality of closely spaced substantially flat elongated bus bars supported within said housing with each bus bar being disposed in a different plane all of which planes are substantially parallel to said side of said housing, each of said bus bars comprising a bar of conducting material and an insulating sleeve supported on said conducting bar and substantially covering said conducting bar, said set of bus bars having opening means at each of said plug-in regions, and each of said bus bars having an uninsulated contact area at one side thereof at each of said plug-in regions whereby when a plug-in unit is mounted on said side of said housing at any of said plug-in regions contact elements of said plug-in unit can pass through said opening means and each of said bus bars can be abutted at its contact area with a different contact element.

5. A section of low impedance bus duct for electric power distribution, said section comprising an elongated structure having a plug-in region at one side thereof, said section comprising an elongated housing having opening means in one planar side thereof at said plug-in region for receiving a number of contact elements of a removable plug-in unit, a set of a plurality of substantially flat elongated bus bars supported within said housing in a parallel closely spaced mutually flatwise relation with their flat faces being disposed in planes generally parallel to said side of said housing, each of said bus bars being constructed such that electric current can be efficiently conducted along the length thereof, the bus bar of said set which is closest to said side of said housing having a number of contact-element-receiving holes in it at said plug-in region which number of holes is one less than the number of said contact elements, each succeeding bus bar in said set having a number of contact-element-receiving holes in it at said plug-in region which number of holes is one less than the number of holes in its preceding bus bar, the bus bar of said set which is furtherest away from said side of said housing having no contact-element-receiving holes in it at said plug-in region, said holes being provided to permit passage therethrough of said contact elements, and said section comprising a plurality of tubular insulating members extending through said holes to receive said contact elements.

6. An elongated section of bus duct for low impedance electric power distribution, said section comprising, in combination, an elongated structure having a plurality of longitudinally spaced plug-in regions at each of two opposite sides thereof, said section comprising an elongated housing having opening means in each of two opposite planar and generally parallel sides thereof each of which opening means is disposed at one of said plug-in regions to receive a number of contact elements of a plug-in unit, two sets of substantially flat bus bars supported in said housing such that all of said bus bars are disposed in a parallel spaced mutually flatwise relation with their flat faces being disposed in planes generally parallel to the planes of said sides of said housing, one of said sets of bus bars being adjacent to one of said sides of said housing and the other of said sets of bus bars being adjacent to the other of said sides of said housing, each of said bus bars comprising a conducting bar and an insulating sleeve supported on and substantially covering said conducting bar, the bus bars in each of said sets having substantially the same thickness and being so positioned that the dimension between adjacent bus bars is less than the dimension of said thickness, each of said sets of bus bars having opening means adjacent each of the opening means of the adjacent side of said housing to permit passage therethrough of the contact elements of a plug-in unit, and each of the bus bars of each set having an uninsulated contact area on one side thereof at each plug-in region for receiving a butt-type contact with one of the contact elements of a plug-in unit.

7. A section of low impedance bus duct for electric power distribution, said section comprising a housing having opening means in one planar side thereof for receiving contact elements of a plug-in unit, a first bus bar disposed within said housing in a first plane generally parallel to said side of said housing, a second bus bar disposed within said housing close to said first bus bar in a second plane generally parallel to said side of said housing, said first bus bar being disposed between said second bus bar and said side of said housing, insulating material disposed between said bus bars to insulate said bus bars from each other, said first bus bar having an opening therein to permit passage therethrough of one of said contact elements, said first bus bar at the perimeter of said opening being uninsulated, said second bus bar having an uninsulated contact surface in proximity to said opening in said first bus bar whereby said second bus bar can receive a butt-type contact with said one contact element, an insulating structure comprising an insulating tube part and an insulating flange part, said insulating structure being positioned at said contact surface with the tube part thereof passing through said opening in said first bus bar, said insulating structure insulating said one contact element from said uninsulated part of said first bus bar, and said insulating structure insulating said contacting surface from said uninsulated part of said first bus bar.

8. A section of low impedance bus duct for electric power distribution, said section comprising a housing having opening means in one planar side thereof for receiving contact elements of a plug-in unit, a set of a plurality of substantially flat closely spaced bus bars supported within said housing, each of said bus bars being disposed in a different plane each of which planes is generally parallel to the plane of said side of said housing each of said bus bars comprising a conducting bar and an insulating cover substantially covering said conducting bar, the bus bar of said set that is the furthest away from said side of said housing having an uninsulated contact surface at the side thereof that faces said side of said housing, each of said other bus bars having an opening therethrough which openings are in alignment forming a passage whereby one of said contact elements can pass through said passage to contact said contact surface of said furthest bus bar, each of said bus bars having an uninsulated surface defining the opening in that bus bar, insulating means comprising a number of insulating structures which number is equal to the number of bus bars that are disposed between said furthest bus bar and said side of said housing, each of said insulating structures comprising a tube part and a flange part, each of said insulating structures being disposed with the flange part thereof between different adjacent bus bars, the tube parts of said insulating structures being disposed in a nested relationship one within the other, and said insulating means insulating said uninsulated surfaces of different bus bars from each other from said contact surface and from said one contact element.

9. A bus duct plug-in unit for making an electrical connection with a plurality of bus bars, said plug-in unit comprising, in combination, a receptacle having a base and opening means in said base, insulating support means having a plurality of wells therein and fastened to the inside of said base in proximity to said opening means, said insulating support means having a plurality of butt-type contact elements resiliently mounted in said wells, when said plug-in unit is in operating position each of said contact elements protruding out through said opening means a different distance, and the difference of protrusion between all of the adjacent of said contact elements being substantially the same whereby said plug-in unit is so constructed that when said plug-in unit is mounted on a side of a bus duct housing wherein a set of a plurality of substantially flat bus bars are supported within said housing in a parallel closely and generally evenly spaced mutually flatwise relation with their flat faces being disposed in planes generally parallel to said side of said housing each of said contact elements can pass through opening means in said bus bars to contact a different bus bar of said set of bus bars.

10. Electrical power distribution apparatus comprising, in comination, an elongated section of low impedance bus duct comprising an elongated housing having opening means in one planar side thereof, a set of a plurality of substantially flat elongated bus bars supported within said housing in a parallel closely spaced mutually flatwise relation with their flat faces being disposed in planes generally parallel to said side of said housing, a plug-in unit comprising a receptacle having opening means therein, a plurality of contact elements mounted in said receptacle and protruding through said opening means in said receptacle and in said side of said housing, said set of bus bars having opening means therein to permit passage therethrough of certain of said contact elements, each of said contact elements contacting a different one of said bus bars, and said set of bus bars comprising a first terminal means at one end thereof and a second terminal means at the other end thereof whereby said section of bus duct is adapted to be connected in a run of bus duct.

11. Electrical power distribution apparatus comprising, in combination, a section of low impedance bus duct comprising an elongated housing having opening means in one side thereof, a set of a plurality of substantially flat elongated but bars supported longitudinally within said housing in a parallel closely spaced mutually flatwise relation with their flat faces being disposed in planes generally parallel to said side of said housing, a removable plug-in unit disposed on said side of said housing and comprising a receptacle having opening means therein, a plurality of contact elements mounted in said receptacle and each protruding a different distance through said opening means in said receptacle and through said opening means in said side of said housing, certain of said bus bars having opening means therein to permit passage therethrough of certain of said contact elements, each of said contact elements contacting one side only of a different one of said bus bars, and said contact elements being spaced longitudinally along said elongated bus bars.

12. Electrical power distribution apparatus comprising, in combination, a section of low impedance bus duct comprising an elongated structure having a plurality of plug-in regions at one side thereof, said section comprising an elongated housing having opening means in said side at each of said plug-in regions, a set of a plurality of substantially flat elongated bus bars supported within said housing in a parallel closely spaced mutually flatwise relation, each of said bus bars comprising a bar of conducting material and an insulating sleeve supported on and substantially covering said bar, each of said bus bars having an uninsulated contact area at each of said plug-in regions, a plug-in device removably mounted on said section adjacent one of said plug-in regions and comprising a number of contact elements equal to the number of bus bars in said set, a first of said contact elements engaging the adjacent contact area of the bus bar closest to said side of said housing, said bus bars having opening means therein and each of the remaining of said contact elements engaging the adjacent contact area of a different one of the other of said bus bars and passing through an opening in each of the bus bars that is disposed between the engaged bus bar and said side of said housing.

13. Electrical power distribution apparatus comprising, in combination, an elongated section of low impedance bus duct, said section having a plurality of longitudinally spaced plug-in regions at one side thereof, said section comprising an elongated housing having opening means in one planar side thereof at each of said plug-in regions, a set of a plurality of substantially flat elongated closely spaced bus bars supported within said housing, each bus bar being disposed in a different plane which plane is parallel to said side of said housing, said set of bus bars having opening means therein adjacent said side of said housing at each of said plug-in regions, each of said bus bars being constructed such that the major part thereof is unbroken whereby current can be efficiently conducted along the length thereof, a plug-in unit comprising a receptacle and a plurality of contact members extending from said receptacle, said plug-in unit being mounted on said housing at one of said plug-in regions, one of said contact members engaging the bus bar that is closest to said side of said housing, each of the other of said contact members contacting a different one of said bus bars of said set and passing through opening means in all of the bus bars that are positioned between the contacted bus bar and said side of said housing, means insulating each of said contact members from all of said bus bars except the bus bar that the contact member engages and connecting means at each of the two opposite ends of said housing and said set of bus bars whereby said section can be connected at each of the two opposite ends thereof to a similar section.

14. Electrical power distribution apparatus comprising, in combination, a section of low-impedance bus duct comprising an elongated structure having a plurality of longitudinally spaced plug-in regions at one side thereof, said section comprising an elongated housing having opening means in one planar side thereof at each of said plug-in regions, a set of closely spaced bus bars comprising a plurality of substantially flat conducting bars supported in said housing insulated from each other, each of said conducting bars being disposed in a different plane each of which planes is generally parallel to said side of said housing, each of said conducting bars having a contact area at each of said plug-in regions, a plug-in unit comprising a receptacle having a base and opening means in said base, insulating support means supported in said receptacle in proximity to said opening means, a plurality of butt-type contact elements resiliently mounted on said insulating support means, each of said contact elements protruding out through opening means in said base a different distance, said plug-in unit being mounted on said housing at one of said plug-in regions, said set of bus bars having opening means therein at each of said plug-in regions, each of said bus bars having an uninsulated contact area at one side thereof at each of said plug-in regions, a first of said contact elements engaging the contact area of the bus bar that is closest to said side of said housing, and each of the remaining of said contact elements engaging the contact area of a different one of the remaining of said bus bars in said set and passing through an opening in all of the bus bars that are disposed between the engaged bus bar and the associated side of said housing, and said section of bus duct having terminal means at each of its two opposite ends whereby said section of bus duct can be connected at each of its two opposite ends to a similar section of bus duct.

15. Electrical power distribution apparatus comprising, in combination, an elongated section of low impedance bus duct for electric power distribution, said section comprising an elongated structure having a plurality of longitudinally spaced plug-in regions at each of two opposite sides thereof, said section comprising an elongated housing having opening means in each of two opposite and generally parallel planar sides thereof each of which opening means is disposed at one of said plug-in regions, two sets of closely spaced substantially flat bus bars supported in said housing such that each of said bus bars is disposed in a different plane each of which planes is generally parallel to said sides of said housing, one of said sets of bus bars being adjacent to one of said sides of said housing and the other of said sets of bus bars being adjacent to the other of said sides of said housing, means insulating said bus bars from each other, each of said bus bars having an uninsulated contact area on the side thereof that faces the adjacent side of said housing, each of said sets of bus bars having opening means adjacent each of the opening means of the adjacent side of said housing, said sets each having the same number of bus bars therein, a plug-in device comprising a number of contact elements equal to the number of contact elements in one of said sets, said plug-in device being removably mounted on one of said sides of said housing at one of said plug-in regions, a plurality of said contact elements passing through the opening means in the associated set of bus bars and each of the contact elements engaging a contact area of a different one of the bus bars of the associated set of bus bars, and said plug-in unit being similarly removably mountable at any of said plug-in regions.

16. Electrical power distribution apparatus comprising, in combination, an elongated section of bus duct for low impedance electric power distribution, said section comprising an elongated structure having a plurality of longitudinally spaced plug-in regions at each of two opposite sides thereof, said section comprising an elongated housing having opening means in each of two opposite and generally parallel planar sides thereof each of which opening means is disposed at one of said plug-in regions, two four wire three phase sets of bus bars being supported adjacent each other in said housing each of which sets comprises a neutral bus bar with the neutral bus bar of one set being adjacent one of said sides and the neutral bus bar of the other set being adjacent the other of said sides, each of said bus bars being disposed in a different plane each of which planes is generally parallel to said sides of said housing, one of said sets being adjacent to one of said sides and the other of said sets being adjacent to the other of said sides, each of said bus bars comprising a conducting bar and an insulating sleeve supported on and substantially covering said conducting bar, in each set the dimension between any two adjacent bus bars being less than twice the thickness of any of the phase bus bars in the set, in each set at each associated plug-in region each bus bar having an uninsulated contact area, a plug-in unit at one of said plug-in regions mounted to tap power off of the set of bus bars associated with that plug-in region, said plug-in unit comprising a receptacle and four contact elements mounted in said receptacle each protruding a different distance from said receptacle, said plug-in unit being removably mounted at one of said plug-in regions on the side of said housing that is associated with said plug-in region, said contact elements passing through the associated opening means in said side of said housing, one of said contact elements engaging the associated contact area of the associated neutral bus bar, each of the other of the remaining three contact elements engaging the associated contact area of a different one of the associated phase conductors and passing through opening means in any of the bus bars disposed between the engaged bus bar and the associated side of said housing, and means insulating each of said contact elements from all of the bus bars except the bus bar that the contact element engages.

17. Electrical power distribution apparatus comprising, in combination, an elongated section of bus duct for low impedance electric power distribution, said section comprising, in combination, an elongated structure having a plurality of longitudinally spaced plug-in regions at each of two opposite sides thereof, said section comprising an elongated housing having opening means in each of two opposite and generally parallel planar sides thereof each of which opening means is disposed at one of said plug-in regions, two four wire three phase sets of bus bars being supported adjacent each other in said housing, each of which sets comprises a neutral bus bar with the neutral bus bar of one of said sets being adjacent one of said sides and the neutral bus bar of the other of said sets being adjacent the other of said sides, each of said bus bars being disposed in a different plane which plane is generally parallel to said sides of said housing, one of said sets being adjacent to one of said sides and the other of said sets being adjacent to the other of said sides, each of said bus bars comprising a conducting bar and an insulating sleeve supported on and substantially covering said conducting bar, in each set the dimension between any two adjacent bus bars being less than the thickness of any of the phase conducting bus bars in the set, in each set at each associated plug-in region each bus bar having an uninsulated contact area on the side thereof that faces the side of said housing that is adjacent to the associated set, a plug-in unit at one of said plug-in regions mounted to tap power off of the set of bus bars associated with that plug-in region, said plug-in unit comprising a receptacle and four butt-type contact elements mounted in said receptacle each protruding a different distance from said receptacle, said plug-in unit being removably mounted at one of said plug-in regions on the side of said housing that is associated with said plug-in region and said contact elements passing through the associated opening means in said side of said housing, one of said contact elements engaging the associated contact area of the associated neutral bus bar, each of the other of the remaining three contact elements engaging the associated contact area of a different one of the associated phase conductors and passing through opening means in all of the bus bars that are disposed between the engaged bus bar and the associated side of said housing, and said section of bus duct and said plug-in unit being constructed such that said plug-in unit can be similarly removably mounted on said section at any of said plug-in regions.

18. Electrical power distribution apparatus comprising low impedance bus duct, said bus duct comprising a set of bus bars comprising at least three substantially flat bus bars, means supporting said three substantially flat bus bars in a closely spaced relationship with their flat faces being disposed in generally parallel planes, said bus bars being supported such that an imaginary straight line normal to said generally parallel planes passes through all of said bus bars, a plug-in unit comprising a receptacle having opening means therein, at least three contact members mounted in said receptacle and protruding out through said opening means in said receptacle, means supporting said plug-in unit in proximity to said set of bus bars, a first of said three contact members engaging a first of said three bus bars, said first bus bar and a second of said bus bars having opening means therein, the second and third of said three contact members passing through said opening means and each engaging a different one of the second and third bus bars whereby each of said three contact members engages a different bus bar of said three bus bars, and insulating means supported on said bus bars and insulating each of said three contact members from the two bus bars that the contact member does not engage.

19. Electrical power distribution apparatus comprising low impedance bus duct, said bus duct comprising a set of bus bars comprising at least three generally flat bus bars, means supporting said bus bars with their flat faces being disposed in generally parallel planes, said bus bars being supported such that an imaginary straight line normal to said generally parallel planes passes through all of said three bus bars, each of said bus bars comprising a conducting bar and an insulating sleeve supported on and substantially covering said conducting bar, said bus bars being supported such that the dimension between each pair of adjacent bus bars is less than double the thickness of any of said three bus bars, each of said bus bars having an uninsulated contact area, a plug-in unit comprising a receptacle having opening means therein, at least three contact members mounted in said receptacle and extending out through said opening means in said receptacle, means supporting said plug-in unit in proximity to said bus bars, a first of said three contact members engaging the uninsulated contact area of a first of said bus bars, said first bus bar and a second of said bus bars having opening means therein, and the second and third of said three contact members passing through said opening means and each engaging a different one of the second and third of said three bus bars at the uninsulated contact area of the engaged bus bar, each of said first and second bus bars having an uninsulated part adjacent said opening means, and at least two flanged tubular insulating structures supported on said set of bus bars in a nested relationship to insulate said uninsulated parts and contact areas of different bus bars from each other.

20. Electrical power distribution apparatus comprising low impedance bus duct, said bus duct comprising two multi-phase sets of closely spaced bus bars each of which sets comprises at least three substantially flat bus bars, means supporting all of said bus bars with their flat faces being disposed in generally parallel planes, all of said bus bars being positioned such that an imaginary straight line normal to said generally parallel planes passes through all of said bus bars, a plug-in unit comprising a receptacle having opening means therein, at least three contact members resiliently mounted in said receptacle and extending out through said opening means in said receptacle means supporting said plug-in unit in proximity to said bus bars, a first of said contact members being in butting engagement with one side only of a first of the bus bars of one of said sets, said first bus bar and a second of the bus bars of said one set having opening means therein, and the other two of said three contact members passing through said opening means and each being in butting engagement with one side only of a different one of the second and third bus bars of said one set.

21. A bus duct plug-in unit for making an electrical connection with a plurality of bus bars, said plug-in unit comprising a receptacle having a base and opening means in said base, insulating support means having a plurality of wells therein and being fastened to the inside of said base in proximity to said opening means, a plurality of lineally spaced separate butt-type contact elements resiliently mounted in said wells, when said plug-in unit is in operating position each of said contact elements protruding out through said opening means a different distance, and the difference of protrusion between all of the adjacent of said contact elements being substantially the same whereby said plug-in unit is so constructed that when said plug-in unit is mounted on a side of a bus duct housing wherein a set of a plurality of substantially flat bus bars are supported within said housing in a parallel closely and generally evenly spaced mutually flatwise relation with their flat faces being disposed in planes generally parallel to said side of said housing each of said contact elements can pass through opening means in said bus bars to contact a different bus bar of said set of bus bars.

References Cited by the Examiner

UNITED STATES PATENTS

| | | | |
|---|---|---|---|
| 1,394,057 | 10/21 | Woernley | 339—48 X |
| 1,687,074 | 10/28 | Wichert | 339—151 |
| 2,006,436 | 7/35 | Bowers | 339—18 |
| 2,042,105 | 5/36 | Kelley | 339—21 X |
| 2,306,353 | 12/42 | Cole et al. | 339—22 |
| 2,369,860 | 2/45 | Schroeder | 339—48 X |
| 2,411,128 | 11/46 | Carlson. | |
| 2,442,984 | 6/48 | Paris | 339—18 |
| 2,576,774 | 11/51 | Carlson. | |
| 2,641,636 | 6/53 | Born et al. | |
| 2,653,991 | 9/53 | Dyer et al. | |
| 2,698,925 | 1/55 | Taylor | 339—22 |
| 2,883,637 | 4/59 | Born | 339—22 |
| 2,946,034 | 7/60 | Washburn | 339—22 |
| 2,965,751 | 12/60 | Stiffel | 339—22 X |

JOSEPH D. SEERS, *Primary Examiner.*